Patented Feb. 3, 1953

2,627,465

UNITED STATES PATENT OFFICE 2,627,465

SOYBEAN-CONTAINING FOOD PRODUCTS WITHOUT SOY TASTE

Elmer K. Pettibone, San Francisco, Calif.

No Drawing. Application November 25, 1949, Serial No. 129,503

9 Claims. (Cl. 99—94)

(Granted under Title 35, U. S. Code (1952), sec. 266)

The invention described herein, if patented, may be manufactured and used by or for the Government for governmental purposes without the payment to me of any royalty thereon.

This invention relates to soybean food products, and particularly to foodstuffs in the nature of candies or confections and the like, and sweet baked products and pastries and the like containing granulated soybean material of a modified character or pre-processed with vegetable protein hydrolysates as the basic food constituent to provide improvements in the nutritive values of such products without the soybean material having the characteristic soya taste.

The value of soya flour or other forms of soya as foodstuffs is known. However, such general knowledge has failed to materialize in the acceptance of soybeans or soybean products as an economic foodstuff of practical value or as a means for improving the protein content of other foods. Primarily this is believed to be due to the inherently bitter taste or taste characteristic of soya flavor and the failure by other than special or impractical methods which apparently fails to alter or modify such flavor to a pleasing or acceptable taste making soya adaptable to general usage.

It is therefore an object of this invention to improve the nutritive value of candies and confections and the like with soybean material having a pleasing and acceptable taste.

It is another object of this invention to provide improved keeping characteristics of candies and confections and the like having high protein content.

It is a further object of this invention to provide candies, confections and the like with soybean material having its taste characteristic altered and modified by hydrolyzed vegetable proteins.

An additional object of this invention is to provide an economical and commercially practical improvement in the protein content of candies and confections and the like.

It is a further object of this invention to provide improvement in various sweet foods, including sweet baked foods, pastries, cookies, waffles, doughnuts, pancakes, and dry packaged prepared mixes for making these foods, including puddings and desserts, by addition of treated soybean material having its taste characteristics altered and modified by being pre-processed with an aqueous solution containing hydrolized vegetable proteins.

The pre-processing or preparing of a soybean material with vegetable protein hydrolysates may be as described in my co-pending application Serial No. 129,501, "Soybean Processing and Products," filed November 25, 1949. This processing comprises generally pretreating the soya with hydrolyzed vegetable proteins of the character as indicated, in solutions of commercial fluidity or concentrated to the degree of fluidity desired. Thereafter the soybean material mixed with hydrolyzed vegetable proteins is broken down to a finer granular state by conventional grinding or milling process. Ordinarily during the grinding process moisture is released or otherwise a standard vacuum or other drying process may be used to dry the compounded soya sufficient for mixing with foodstuffs of the character herein described. Another such process embodies adding from 2% to 40% or more of the vegetable protein hydrolysates concentrated to a solids content of substantially 80% to 96% and while in a plastic warm state, to soybeans in the whole, cracked or particle state including grit and so on, and mixing by masticating, kneading or simple agitation, as by conventional mechanical mixers. After agitation, the soybean mixture is compounded by milling or grinding to a dry granulated form in the manner as described in the aforementioned application. Thereafter, the compounded soybean material may be utilized by mixing with foodstuffs as an addition or substitute for flour and starches and the like in the manner as hereinafter illustrated.

To assure proper drying, the compounding of the soya and hydrolysate, in any case, may be performed under a conventional vacuum process for a sufficient period to thoroughly modify the soybean material and dry the compound without loss of hydrolysate values. Otherwise slow heating of the soya compound, under temperatures which avoid decomposition of the hydrolysates and nutrient values, may be used to dry the plastic or fluid compositions. Usually, however, grinding or milling of the mixture to produce fine granular soybean bases, to and including flour, will create sufficient heat to convert the compound to a dry state. In all of these cases the pretreated soybean material is rendered applicable for preparation of foodstuffs of the character as herein described.

The vegetable protein hydrolysates are commercial liquid extractions secured from hydrolyzing wheat, corn, soybeans, or sugar beet waste, and the like, preferably with retention of all the products of the hydrolyzing process, including for best results, not less than 30 parts by weight monosodium glutamate (or glutamic acid) per 100 parts of protein solids. However, vegetable hydrolysates containing lower percentages of glutamic acid or possibly without some of the amino acids may be permissible in some instances, in fluid or plastic condition, to pre-treat soybeans in the manner as described in my companion application.

The soya compound containing vegetable protein hydrolysates prepared as above indicated may be in dry form in various granulation sizes, to include a granulation size comparable to a conventional flour, and is friable, or fluffy, or powdery, and may be packaged and sold in these forms, as described in my companion application heretofore mentioned, for use in making candies and confections and the like, and for making other sweet foods including pastries and prepared mixes or powders for such articles as waffle and pancake mixes, cake mixes, pudding and dessert powders, and many other foodstuffs of the character as described herein. The prepared soya material in this dry form may be added in amounts of substantially 2% to 70% more or less to candies and confections and the like and to other sweet food products as stated herein, to provide them with a protein content or an increase in protein content and a distinctly improved flavor characteristic without need for special flavoring agents. The prepared soybean compound as described may be used as an ingredient in the manufacture of candies and confections and the like by mixing with a sugar syrup, and also by mixing with other conventional ingredients for making candies and confections and the like. Flavoring agents may be used in combination with the prepared soybean material to modify the flavor change, in the nature of sweetening agents as sucrose, dextrose, fructose, levulose and invert sugars and the like in proportions generally from 50 to 75% of the finished candies and confections and the like but varied to suit taste preferences. Other and varying portions of conventional flavoring agents may be included with the prepared soybean material and also conventional ingredients for making candies and confections and the like, including milk, cream, butter, nuts, fruits, eggs, chocolate, cocoa and the like and stabilizing and stiffening and also sugar inverting agents, and various flavoring materials, and flavoring extracts.

For making other sweet foods as named herein, the prepared soybean material may be mixed with conventional ingredients including flour, baking powder, gelatin, sugar, powdered or fresh eggs and the like in preferred proportions.

Generally the increase in protein value of a candy made by inclusion of the prepared soybean material as described is regulated by the proportion of protein in the soybean particles, the quantity of protein provided by the vegetable protein hydrolysates which are compounded with the soybean particles, the percentage of moisture in the finished candies or confections and the like, and the proportions of candy making ingredients which may be added to the mixture of sugar syrup and prepared soybean material. For example, the soybean particles themselves may have a protein value of 44% on a dry basis, and in each 100 pounds of the prepared soybean material there may be an added 4 pounds of protein from the solids of vegetable protein hydrolysates, or other proportions as preferred for specific purposes and results.

In addition to use of the compounded soybean material as an ingredient for making candies, confections, etc., it may also be used as an ingredient in making baked food products of the sweet type, such as cakes, cookies, doughnuts, waffles, pancakes, and similar products to improve their taste and protein content. The intensity of flavor change caused by adding the compounded soya material is regulated as preferred, and may range from a flavor similar to maple, coconut and brown sugar to a flavor in which these specific flavors are not readily discernible; for example if the compounded soya material contains 5% of solids of vegetable protein hydrolysates and 5% of this compounded soybean material is substituted for wheat flour in making a doughnut the doughnut will have increased richness of flavor, increased protein value and improved keeping qualities but will not have a flavor readily discernible as differing from the flavor of a doughnut made from conventional ingredients. If the percentage of solids of vegetable protein hydrolysates within the compounded soybean material and the percentage of this compounded soybean material substituted for wheat flour are sufficiently increased, the doughnut may take on a degree of maple and coconut flavor dependent upon the degree of soybean modification, but not to a large extent, as these flavors are developed when there is more sugar present than might be found in an ordinary doughnut mix. But in some foods such as cakes in which a relatively high percentage of sugar is used the combination of this sugar with the compounded soybean material may produce a distinct maple and coconut flavor dependent upon lesser or greater quantities of sugar content and soybean modification respectively.

More specific examples of compositions in which the prepared soybean compound is included, in proportionate parts by solids weight to provide added protein value with or without additional flavoring are as follows:

*Example I.*—A type of high protein candy containing about 16% protein.

12 lbs. sucrose
8 lbs. water
9 lbs. prepared soya compound containing 90% soya analyzing 44 per cent protein, and 10 per cent solids of vegetable protein hydrolysates these solids including the salt. Vanilla extract is preferred.

The sucrose and water are cooked to a sugar syrup, of any preferred temperature and degree of concentration, to provide the degree of hardness or softness desired in the finished candy. A preferred concentration is to cook the syrup to 235° F. until a few drops of the cooked composition forms a soft ball in ice cold water, or otherwise forms a crack stage as known in the culinary art.

A portion of the sucrose may be replaced by invert sugar if preferred; or sugar inverting agents may be added to the syrup.

The prepared soybean material may be in any preferred size of granulation, including a granulation size resembling flour.

The prepared soybean material is mixed into the sugar syrup by simple agitation, or by other methods as preferred.

The syrup absorbs or adsorbs the addition product constituting the prepared soybean material and undergoes a complete change of flavor.

The character of flavor change is influenced by the proportion of solids of vegetable protein hydrolysates in the prepared soya material. If a lesser degree of flavor change is preferred the prepared soybean material may contain 6, or 7, or 8% of solids of vegetable protein hydrolysates.

To the mixture of syrup and prepared soybean material there may be added any other conventional candy making ingredients as preferred.

*Example II.*—For a type of candy having protein value of about 8%.

Same as foregoing example, but use only 4.5 lbs. of the prepared soybean material, this containing 10% of solids of vegetable protein hydrolysates.

This formula will produce a lighter colored candy, and if the soya material is made from large particles of soybeans and then ground so as to be flaky particles, the candy has the distinct appearance and flavor of a candy containing coconut.

After mixing until the ingredients are uniformly dispersed and after cooking or processing as the normal composition requires, the candies may be placed in a mold for setting or solidification in a conventional manner. The resulting sweetened soya product is firm but relatively soft and moist without stickiness. Even on standing for a period of six months without wrapping or coating the moisture and plasticity are retained and the flavor seems improved.

Further, prepared candy mixes of conventional creams, chocolates, fudges and the like, cooked or processed in conventional manner and dispensed in individual or bar form, may contain soya treated or compounded with vegetable protein hydrolysates in any practical proportions, for example, of from 2% to 70% of the total weight of the mix. With the soya pretreated, as described, there is secured a flavor ranging from a blend resembling coconut, maple and brown sugar to blends in which the maple flavor is most predominant, or the coconut flavor is most predominant, or the brown sugar flavor is most predominant, in each case with traces of the other flavors named, dependent on proportions of ingredients and manner of processing.

*Example III.*—For a type of cookie with high protein value.

300 lbs. prepared soybean material containing 8% solids of vegetable protein hydrolysates
100 lbs. wheat flour
150 lbs. sugar, granulated or powdered as preferred
50 lbs. egg white
300 lbs. water
Vanilla flavoring if preferred.

Mix sugar, egg white and water and beat well. Mix in the vanilla extract, if used.

Add the prepared soybean material and the wheat flour and mix to a stiff dough. Bake for about 1 hour in moderate oven.

If a very high protein, low sugar cookie is preferred, the sugar and wheat flour may be reduced each to 50 pounds.

*Example IV.*—For prepared soybean material used in a prepared dry packaged mix for making waffles, or a mix for making doughnuts, etc., upon the addition of a fluid as water or milk to make the dough composition plastic or fluid, as the case may be and known in the culinary art.

95 lbs. conventional ingredients, flour, baking powder, sugar, milk, eggs, flavoring, etc.

5 lbs. dry prepared soybean material, containing 10% solids of vegetable protein hydrolysates and ground to a dry flour in the manner as described.

Mix by mechanical agitation, sifting or the like and package by conventional means, as desired. As illustrated by this example, the balance of the formulas may be similarly prepared without the addition of moisture.

Likewise standard dough mixes in the nature of bread, cooky, cake, pancake, doughnut, and other foodstuffs of like nature may contain as a substitute or partial substitute for the usual flour or starch components, treated soybean flour prepared as described in my copending application above mentioned. In such mixtures the treated soybean material may be included as a proportional part substituted for the regular cereal flour, in quantity as above indicated or more or less as desired and thence with the balance of the ingredients included is compounded as a prepared product and packaged for cooking or processing as with the addition of milk and water or otherwise in the usual manner. Further, soybean grits or particles treated in the manner as described may be mixed, by conventional means with the dough batches in suitable quantities of from 2% to 70% or more or less based on the weight of the batch. Such foodstuffs when prepared and cooked in the usual manner provide an economical food with protein values which are increased proportionally to the value of the treated soybean addition and may be as high as 20% or more. Such foodstuffs are found to have a pleasing flavor without the readily perceptible characteristic soya flavor and possess improved keeping qualities.

In addition, for some purposes wherein protein value is insignificant or taste modification of the soya flavor of lesser value, it is possible to obtain some modification of the soya by mixing hydrolyzed vegetable proteins in fluid form and with soya, sweetening agents, flavorings, and other ingredients commonly used for making candies, confections or other foodstuffs and thereafter cook or otherwise process the mixture to secure a product of improved protein value but having a less favorable taste characteristic. Although these mixtures compounded in this manner are less desirable, with respect to change in taste characteristic, the percentages of soya and hydrolyzed vegetable proteins may be in the same proportions as heretofore indicated.

Further, examples in which the soya modified by hydrolyzed vegetable proteins may be utilized are in the making of chewing gums, cooking syrups, table syrups, fountain syrups, ice cream, sherbets, sweet beverages, and many other foodstuffs of like nature with or without the inclusion of pectins or gelatins and the like. In these preparations the percentages of hydrolyzed vegetable proteins to soya are in the amounts as above indicated and the modified soya is included as a substitute for starch or other carbohydrate materials in standard mixtures in proportions of from 2% to 70% or slightly more or less and the mixture thereafter cooked or processed in the usual manner.

The commercial solutions of vegetable protein hydrolysates, herein described, are obtained by conventional commercial processes, including acid hydrolysis, alkali hydrolysis or enzymatic hydrolysis of vegetable protein usually derived from wheat, corn, soybeans, sugar beet by-product, or any combination of these, and other like vegetable sources.

The preferred solution is one which retains substantially all of the amino acids obtained by hydrolyzing proteins of the character indicated. These amino acids may vary in number and in percentage of each dependent upon the basic raw material or materials used and the method of processing and hydrolyzing. However, as an illustrative example, a commercial solution of vegetable protein hydrolysates, used in the manner as described herein, contains most or all of the following named amino acids:

| | |
|---|---|
| Alanine | Lysine |
| Arginine | Methionine |
| Aspartic acid | Phenylalanine |
| Cystine | Proline |
| Glutamic acid | Serine |
| Glycine | Tyrosine |
| Histidine | Threonine |
| Hydroxyproline | Thyroxine |
| Isoleucine | Valine |
| Leucine | |

Some commercial solutions of vegetable protein hydrolysates may contain amino acids not specifically mentioned, as for example, in some instances the amino acid tryptophane may be added or otherwise, the solution may lack one or more of the amino acids for some specific purposes. Further, some amino acids may be present in varying quantities or percentages and one or more may be present in such small quantities as to constitute what are commonly known as trace materials. While some variations are permissible, due to the vegetable source or otherwise as heretofore indicated, it is preferred for most purposes, as herein indicated, that the glutamic acid constitute at least approximately 30 parts per 100 parts by weight of the solids content of the solution.

From the foregoing description of my invention or discovery in improving the edible value of soybeans by overcoming their inherently objectionable taste, and improving the protein value of candies, confections, sweet baked foods or the like, in addition to their keeping characteristics, it will be apparent that varying percentages and slight modification may be made in compounding foodstuffs utilizing soya modified by reaction, aging or otherwise with vegetable protein hydrolysates such as will fall within the scope of my claims.

I claim:

1. A food composition in powder form, comprising a non-soy foodstuff in powdered form, soybean flour and in intimate association therewith and inseparably adhered thereto hydrolyzed vegetable protein, said soybean flour being present in a proportion of from about 2 to about 70 parts by weight per 100 parts by weight of said food composition and said hydrolyzed vegetable protein being present in a proportion from about 2 to about 40 parts by weight per 100 parts by weight of the sum of the weight of said soybean flour and of said hydrolyzed vegetable protein, said soybean flour and hydrolyzed vegetable protein being inseparably adhered to each other in a substantially uniformly finely divided homogeneous condition, and said food composition being characterized by a flavor substantially devoid of palatably objectionable soya flavor.

2. A food composition in powder form, comprising a non-soy foodstuff in powdered form, soybean flour and in intimate association therewith and inseparably adhered thereto hydrolyzed vegetable protein, said soybean flour being present in a proportion of from about 2 to about 70 parts by weight per 100 parts by weight of said food composition, and said hydrolyzed vegetable protein being present in a proportion from about 2 to about 40 parts by weight per 100 parts by weight of the sum of the weight of said soybean flour and of said hydrolyzed vegetable protein, and at least about 30% of said hydrolyzed vegetable protein being glutamic acid, said soybean flour and hydrolyzed vegetable protein being inseparably adhered to each other in a substantially uniformly finely divided homogeneous condition, and said food composition being characterized by a flavor substantially devoid of palatably objectionable soya flavor.

3. A food composition according to claim 1, wherein said non-soy foodstuff is a dry powdered jelling agent.

4. A food composition according to claim 1, wherein said non-soy foodstuff is dry powdered gelatin.

5. A food composition according to claim 1, wherein said non-soy foodstuff is sugar.

6. Candy made from a food composition according to claim 5.

7. A food composition according to claim 1, wherein said non-soy foodstuff is cereal flour.

8. A baked food product made from a food composition according to claim 7.

9. A sweet baked product made from a food composition according to claim 7, said food composition also containing a sweetening agent.

ELMER K. PETTIBONE.

REFERENCES CITED

The following references are of record in the file of this patent:

UNITED STATES PATENTS

| Number | Name | Date |
|---|---|---|
| 1,992,462 | Barnett | Feb. 26, 1935 |
| 2,135,594 | Nohe et al. | Nov. 8, 1938 |
| 2,344,229 | Block et al. | Mar. 14, 1944 |
| 2,379,441 | Kaehler | July 3, 1945 |
| 2,434,087 | Weber | Jan. 6, 1948 |

FOREIGN PATENTS

| Number | Country | Date |
|---|---|---|
| 407,866 | Great Britain | Mar. 29, 1934 |

OTHER REFERENCES

"Trade News," Food Manufacture, April 1931, page 118.

Salomon, Food Manufacture, March 1943, pages 91 and 92.

Science News Letter, July 15, 1950, pages 42 and 43.

Food Manufacture, September 1950, pages 378 and 379.